US008455140B1

(12) United States Patent
Huang et al.

(10) Patent No.: US 8,455,140 B1
(45) Date of Patent: Jun. 4, 2013

(54) POROUS POLYMER SEPARATOR LAYER HAVING A NON-UNIFORM CROSS SECTIONAL THICKNESS FOR USE IN A SECONDARY LIQUID ELECTROLYTE BATTERY

(75) Inventors: Xiaosong Huang, Novi, MI (US); Hamid G. Kia, Bloomfield Hills, MI (US); Mark W. Verbrugge, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/473,863

(22) Filed: May 17, 2012

(51) Int. Cl.
*H01M 2/18* (2006.01)
(52) U.S. Cl.
USPC .......................... 429/246; 429/247; 429/254
(58) Field of Classification Search
None
See application file for complete search history.

(56) References Cited

U.S. PATENT DOCUMENTS

| | | | | |
|---|---|---|---|---|
| 3,861,963 | A * | 1/1975 | Afrance et al. | 429/251 |
| 3,876,738 | A * | 4/1975 | Marinaccio et al. | 264/41 |
| 4,707,400 | A * | 11/1987 | Towery | 442/63 |
| 4,764,320 | A * | 8/1988 | Chau et al. | 210/500.41 |
| 5,515,170 | A * | 5/1996 | Matzinger et al. | 356/423 |
| 5,846,422 | A * | 12/1998 | Ditter et al. | 210/500.41 |
| 6,187,248 | B1 * | 2/2001 | O'Neill et al. | 264/425 |
| 6,232,007 | B1 * | 5/2001 | Payne et al. | 429/403 |
| 6,497,977 | B1 * | 12/2002 | Stone et al. | 429/129 |
| 2006/0204839 | A1 * | 9/2006 | Richards et al. | 429/246 |
| 2009/0155678 | A1 * | 6/2009 | Less et al. | 429/246 |
| 2009/0311607 | A1 * | 12/2009 | Han et al. | 429/246 |
| 2010/0015530 | A1 * | 1/2010 | Katayama et al. | 429/246 |
| 2012/0156568 | A1 | 6/2012 | Kia et al. | |
| 2012/0156569 | A1 | 6/2012 | Kia et al. | |

OTHER PUBLICATIONS

High Energy Density Lithium Battteries, Aifantis, K.E., Hackney, S.A. & Kumar, R.V., Editors, Wiley-VCH, 2010, p. 35.*
U.S. Appl. No. 13/149,205; Title: Methods of Making Lithium Ion Battery Separators; Filed: May 31, 2011; First Named Inventor: Xiaosong Huang.
U.S. Appl. No. 13/299,480; Title: Making a Lithium Ion Battery Separator; Filed: Nov. 18, 2011; First Named Inventor: Xiaosong Huang.
U.S. Appl. No. 13/473,750; Title: Porous Polymer Separator Layer Having a Non-Uniform Cross-Sectional Thickness for Use in a Secondary Liquid-Electrolyte Battery; Filed: May 17, 2012; First Named Inventor: Xiaosong Huang.

* cited by examiner

*Primary Examiner* — Patrick Ryan
*Assistant Examiner* — Jose Colucci Rios
(74) *Attorney, Agent, or Firm* — Reising Ethington P.C.

(57) ABSTRACT

A porous polymer separator layer that exhibits a non-uniform cross-sectional thickness and a method of making the same are disclosed. The porous polymer separator layer may be made by a phase-separation process. This process involves precipitating the porous polymer separator layer from a film having a non-uniform cross-sectional thickness similar to that sought to be imparted to the resultant separator layer. An electrochemical battery cell for a secondary liquid-electrolyte battery may incorporate the disclosed porous polymer separator layer between a negative electrode and a positive electrode in a way that that helps maintain a more evenly distributed current density within the cell.

20 Claims, 3 Drawing Sheets

POROUS POLYMER SEPARATOR LAYER HAVING A NON-UNIFORM CROSS SECTIONAL THICKNESS FOR USE IN A SECONDARY LIQUID ELECTROLYTE BATTERY

TECHNICAL FIELD

The technical field of this disclosure relates generally to separators for use in secondary liquid-electrolyte batteries and, more specifically, to a porous polymer separator layer having a non-uniform cross-sectional thickness.

BACKGROUND

A secondary liquid-electrolyte battery generally contains at least one electrochemical battery cell that include a negative electrode, a positive electrode, and a separator situated between the electrodes. The negative and positive electrodes are constructed from materials that can participate in both oxidation and reduction reactions. Such materials allow an electric current to be reversibly passed between the electrodes, external to the separator, while an ionic species migrates through the separator within a liquid electrolyte to electrochemically balance the current flow. This type of electrical and ionic current flow occurs spontaneously (cell discharge phase in which oxidation occurs at the negative electrode and reduction occurs at the positive electrode) or is compelled (cell charge phase in which oxidation occurs at the positive electrode and reduction occurs at the negative electrode). The electric current generated during cell discharge may be used to power, at least in part, an electrical load while an applied voltage from an external power source may be used to charge, or re-power, the cell once its current capacity has fallen to an undesirable level.

The separator facilitates operation of the electrochemical battery cell by providing a porous and electrically-insulative mechanical support barrier between the two electrodes. The separator, in general, has a porosity sufficient to contain the liquid electrolyte—which can communicate the ionic species—yet is thermally, chemically, and mechanically stable enough to separate the negative and positive electrodes over the course of many discharge/charge cell cycles so that a short-circuit is prevented. A wide variety of materials, either alone or in combination with one another, have been either utilized or investigated for construction of the separator with the goal of imparting long term operational reliability to the separator within different working environments. The most commonly used separators today are made from a single flat polyolefin sheet membrane or a laminate of several flat polyolefin sheet membranes. The particular polyolefins usually employed are those derived from simple low-carbon number olefins, such as polypropylene and polyethylene.

The electrochemical battery cell, in order to interact with the electrical load and the external power source, is configured for connection to an external circuit that provides an electric current path between the negative and positive electrodes around the separator. Each of the negative and positive electrodes, for instance, is typically associated with a metallic current collector that helps distribute the electric current passing through the external circuit to and from all electrochemically active regions of the electrodes. A connection feature such as connector tab may be included on each of the metallic current collectors. The connection feature may protrude away from the electrochemical battery cell to operatively establish an electrical connection with the external circuit. This is usually accomplished by connecting the protruding connection features associated with the negative and positive electrodes to negative and positive terminals, respectively, in either a serial or parallel relationship with the connection features associated with other electrochemical battery cells. Negative and positive terminals may not be needed, however, if the secondary liquid-electrolyte battery includes only one electrochemical battery cell.

The connection feature included on a metallic current collector is commonly located near a peripheral edge of the current collector for various practical reasons including, among others, accessibility. But locating the connection feature in this way can cause an uneven current density distribution to develop within the electrochemical battery cell. For instance, during oxidation of the associated electrode, the connection feature may have a tendency to draw electric current from a nearby portion of the electrode at a greater rate than more distant portions. Likewise, during reduction of the associated electrode, the connection feature may have a tendency to make electric current more readily available for ionic species reduction at a nearby portion of the electrode as opposed to other portions further removed. Such differences in electrochemical activity can become even more pronounced if the connection features of the metallic current collectors are all located on the same side of the cell. Nonetheless, however developed, a region of the electrochemical battery cell that experiences disparately greater current density can result in some potentially undesirable effects over the life of the battery.

SUMMARY OF THE DISCLOSURE

A porous polymer separator layer that may function as all or part of a separator for an electrochemical battery cell (sometimes referred to as "a cell" or "the cell" for brevity) of a secondary liquid-electrolyte battery, such as a lithium ion battery, and a method of making the same are disclosed. The porous polymer separator layer includes a first edge and a second edge that define a width of the separator layer, and a first major face and a second major face extending between the first and second edges that define a thickness of the separator layer. The first edge has a first height and the second edge has a second height. Each of the first and second heights establish the thickness of the porous polymer separator layer at the first and second edges, respectively, and together provide the separator layer with a non-uniform cross-sectional thickness spanning the width of the separator layer. To establish this non-uniform cross-sectional thickness, for example, the first height of the first edge is rendered greater than the second height of the second edge so that the thickness of the porous polymer separator layer decreases from the first edge to the second edge as the major faces converge towards one another.

The structure of the porous polymer separator layer is provided by a polymer matrix comprised of any polymer material that exhibits suitable mechanical and chemical properties. The polymer matrix includes a porosity that traverses the thickness of the porous polymer separator layer and connects the opposed first and second major faces. Such a porosity is derived from pores that are distributed throughout the polymer matrix. These pores are generally small enough and sufficiently distributed that contact between the electrode surfaces situated on opposite sides the porous polymer separator layer can be prevented yet still large enough and adequately interconnected to contain a liquid electrolyte and facilitate ion transport. The porosity of the porous polymer separator layer as a whole is usually anywhere between about 30% and about 90%. The porosity may be distributed to allow communication of an ionic species through the thickness of the porous polymer separator layer coextensively between the first and second opposed major faces when an infiltrated liquid electrolyte is present. In a preferred embodiment, moreover, the porosity is evenly distributed throughout the porous polymer separator layer.

The porous polymer separator layer, when incorporated into an electrochemical battery cell of a secondary liquid-electrolyte battery, may be oriented in a way that helps maintain a more evenly distributed current density within the cell. To accomplish this objective, for example, the porous polymer separator layer may be oriented so that the first edge is located between confronting surfaces of a negative electrode and a positive electrode in a region of the cell where the electrodes are prone to experience increased relative electrochemical activity. Orienting the first edge of the porous polymer separator layer in this way compensates for the tendency to experience increased localized electrochemical activity in that particular region of the cell by making the mobile ionic species travel a greater distance through the thicker edge of the separator layer. The electrochemical activity experienced throughout the electrodes, and thus the current density of the electrochemical battery cell, is therefore more equalized since the porous polymer separator layer renders the ionic species more evenly available to the electrodes despite differing electrochemical driving forces.

The porous polymer separator layer may be made by a phase-separation process in which the separator layer is precipitated from a film having a non-uniform cross-sectional thickness similar to that sought to be imparted to the resultant separator layer. The phase-separation process may involve (1) forming the film from a polymer solution that comprises a polymer material dissolved in a polymer solvent and (2) precipitating the polymer material. Several different techniques may be employed to precipitate the porous polymer separator layer from the film depending on the polymer material selected to make the separator layer, the polymer solvents that are available for dissolving the selected polymer material, and the practicalities that accompany such precipitation techniques, to name but a few factors. The porous polymer separator layer is also preferably dried before being incorporated into an electrochemical battery cell of a secondary liquid-electrolyte battery.

DETAILED DESCRIPTION

A preferred exemplary embodiment of a porous polymer separator layer 10 having a non-uniform cross-sectional thickness, and a method of making the separator layer 10 by a phase-separation process, are disclosed. The porous polymer separator layer 10 may be used in an electrochemical battery cell of a secondary liquid-electrolyte battery. An electrochemical battery cell of this type generally includes a negative electrode, a positive electrode, and a separator disposed between, and in interfacial contact with, the two electrodes. It further satisfies two general operational requirements: first, the electrochemical half-reactions that take place at the negative and positive electrodes are reversible so that the cell's capacity can be discharged multiple times and, second, the separator situated between the negative and positive electrodes is infiltrated with a liquid electrolyte that can communicate an electrochemically appropriate ionic species between the electrodes. Some notable examples of a secondary liquid-electrolyte battery that contains at least one such electrochemical battery cell—and usually a plurality of such cells electrically coupled together depending on the expected use of the battery—are a lithium ion battery, a nickel-cadmium battery, a nickel-metal hydride battery, and a lead-acid battery.

The separator is included in the electrochemical battery cell to physically separate and electrically insulate the electrodes while permitting the internal migration of a mobile ionic species through its infiltrated liquid electrolyte. The porous polymer separator layer 10 disclosed here is mechanically and thermally stable enough, and is sufficiently porous, that it may function entirely as a single-layer separator or it may be combined with other materials to fabricate a multi-component composite separator. The porous polymer separator layer 10, on account of its non-uniform cross-sectional thickness, can also be oriented relative to the negative and positive electrodes to achieve a more evenly distributed current density within the cell. This may be accomplished by positioning the thicker portion of the porous polymer separator layer 10 between the surfaces of the negative and positive electrodes at a region of the cell where the electrodes have a tendency to experience more electrochemical activity because of some driving force such as, for example, a close proximity to a connection feature of an associated metallic current collector.

The porous polymer separator layer 10 will now be described in more detail within the context of an electrochemical battery cell for a lithium ion battery. This type of battery technology is considered by the automobile industry to be one of the primary candidates for integration into the powertrains of a hybrid electric vehicle (HEV) and an extended range electric vehicle (EREV), as well as other possible applications. Skilled artisans will, however, be more than capable of adapting this disclosure to the other types of secondary liquid-electrolyte batteries mentioned before. This is because the use of the porous polymer separator layer 10 in an electrochemical battery cell of a lithium ion battery is generally representative of how the separator layer 10 would be used in those other types of liquid-electrolyte batteries. The fact that each of the previously-mentioned liquid-electrolyte batteries contains one or more electrochemical battery cells having different electrode constructions, different liquid electrolytes, and different electrochemical mechanisms is not considered to be a significant impediment to the robust use of the porous polymer separator layer 10.

Figure 1:
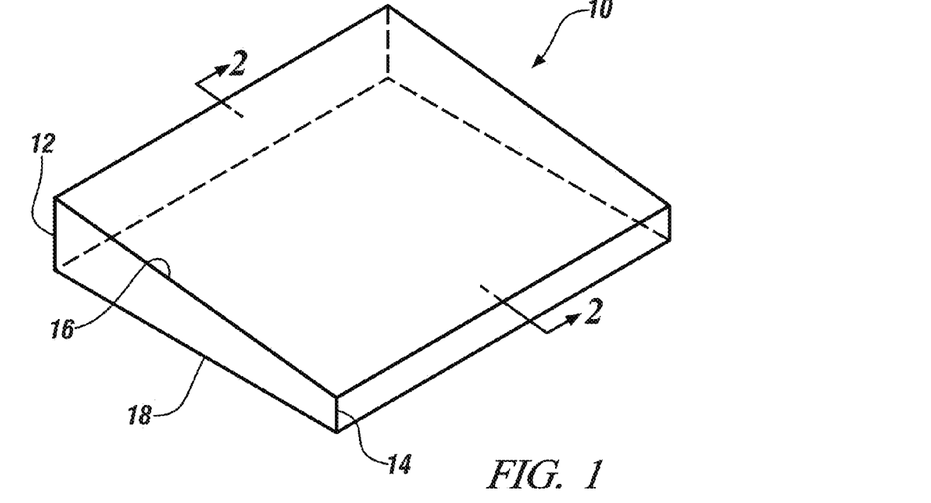
FIG. 1 is a generalized perspective view of a porous polymer separator layer for use in an electrochemical battery cell of a secondary liquid-electrolyte battery.
Figure 2:
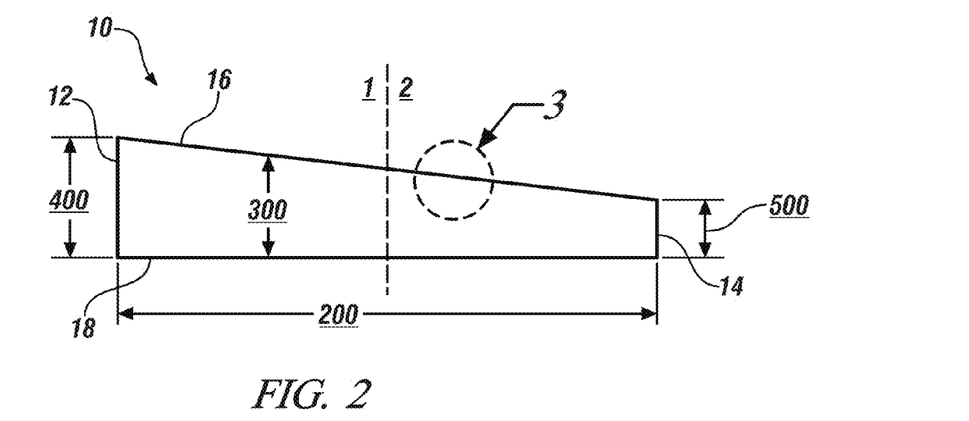
FIG. 2 is a generalized cross-sectional view of the porous polymer separator layer shown in FIG. 1 taken along the line 2-2.
Figure 3:
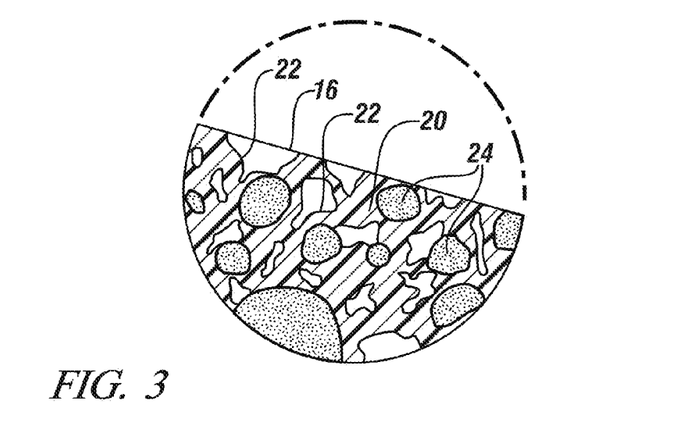
FIG. 3 is a generalized and partially magnified cross-sectional view of the porous polymer separator layer taken from the encircled portion of FIG. 2 and identified by the numeral 3.

FIGS. 1-3 illustratively show an idealized depiction of the porous polymer separator layer 10 that may function as all or part of a separator for use in an electrochemical battery cell of a lithium ion battery. The porous polymer separator layer 10 includes a first edge 12 and a second edge 14 opposite the first edge 12. These edges 12, 14 define a width 200 of the porous polymer separator layer 10. Extending between the first and second edges 12, 14 opposite one another is a first major face 16 and a second major face 18. These faces 16, 18 define a thickness 300 of the porous polymer separator layer 10 in a direction generally perpendicular to the width 200 direction. The first and second major faces 16, 18 are significantly larger in surface area than the first and second edges 12, 14 because they are intended to emulate the size of the spaced-apart confronting surfaces of a negative electrode and a positive electrode which, in the construct of an electrochemical battery cell of a lithium ion battery, are situated on opposite sides of the separator layer 10.

The porous polymer separator layer 10, as shown best in FIG. 2, has a cross-section spanning its width 200 that exhibits a non-uniform thickness. This cross-section includes the first edge 12, which has a first height 400, and the second edge 14, which has a second height 500. These first and second edge heights 400, 500 establish the spacing between the first and second major faces 16, 18 and, consequently, the thickness 300 of the porous polymer separator layer 10 at the first and second edges 12, 14, respectively. Moreover, in terms of their relationship, the height 400 of the first edge 12 is greater than the height 500 of the second edge 14 such that the thickness 300 of the porous polymer separator 10 decreases from the first edge 12 to the second edge 14 as the major faces 16, 18 converge towards one another. The difference between the heights 400, 500 of the first and second edges 12, 14 is not a random variation that falls within an acceptable tolerance range usually associated with a uniform cross-sectional thickness; rather, it is meant and controlled to be more pronounced. The height 400 of the first edge 12, more specifically, in a preferred embodiment, is about 2% to about 50% greater than the height 500 of the second edge 14, more preferably about 5% to about 40% greater, and most preferably about 5% to about 30% greater.

The heights 400, 500 of both the first and second edges 12, 14 are preferably between about 5 μm and about 50 μm, more preferably between about 10 μm and about 45 μm, and most preferably between about 20 μm and about 35 μm while maintaining their differential height relationship. For example, if the height 500 of the second edge 14 is 20 μm, then the height 400 of the first edge 14 is preferably between about 20.4 μm (2% greater) to about 30 μm (50% greater), more preferably between about 21 μm (5% greater) to about 28 μm (40% greater), and most preferably between about 21 μm (5% greater) to about 26 μm (30% greater). The exact height difference sought to be achieved between the first and second heights 400, 500 for a given lithium ion battery application, however, depends on several factors. Considerations like the composition of the porous polymer separator layer 10, the composition and construction of the negative and positive electrodes, and the surface areas of the first and second major faces 16, 18, to name but a few factors, would all be considered by a skilled artisan when selecting a target height 400, 500 for the first and second edges 12, 14 and the corresponding non-uniform thickness at the cross-section of the porous polymer separator layer 10.

The bulk structure of the porous polymer separator layer 10 is provided by a polymer matrix 20, as depicted generally in FIG. 3. The polymer matrix 20 may be comprised of any polymer material that exhibits mechanical and chemical properties suitable for use within an electrochemical battery cell of a lithium ion battery. Some exemplary polymer materials that may constitute the polymer matrix 20 include a polyimide such as polyetherimide (PEI), a fluoropolymer such as polyvinylidene fluoride (PVdF), a polysulfone such as standard polysulfone (PSf) (reaction product of 2,2-bis(4-hydroxyl)propane and 4,4'-dichlorodiphenyl sulfone), polyarylsulfone (PAS), polyethersulfone (PES), and polyphenylsulfone (PPSf), a polyacrylate such as poly(methyl methacrylate) (PMMA), an aliphatic polyamide (PA) such as polyhexamethylene adipamide (nylon 6,6) and polycaprolactam (nylon 6), an aromatic polyamide such as polyparaphenylene terephthalamide (i.e., Kevlar®), cellulose, cellulose derivatives such as cellulose acetate and carboxymethyl cellulose, a polycarbonate (PC) such as poly(bisphenol A-carbonate), a polyurethane (PU) such as polyether- and polyester-based polyurethanes, an acrylic such as polyacrylonitrile (PAN), and mixtures thereof. PEI, PAN PSf, PPSf and PVdF are the most preferred polymer materials because they provide a good balance of mechanical and chemical stability and ease of manufacture.

In order to accommodate the internal communication of lithium ions, a porosity that traverses the thickness 300 of the porous polymer separator layer 10 and connects the opposed first and second major faces 16, 18 is provided within polymer matrix 20. The term "porosity" as used here refers to the volume percentage of the porous polymer separator layer 10 within the polymer matrix 20 that is occupied by pores 22, which are depicted generally in FIG. 3 although not necessarily to scale. These pores 22 may vary in size, shape, and spacing. But collectively they are generally small enough and sufficiently distributed to prevent contact between the confronting surfaces of the negative and positive electrodes the separator layer 10 is meant to separate yet still large enough and adequately interconnected to contain a liquid electrolyte and facilitate lithium ion mobility. A notable proportion of the pores, for instance, preferably has at least one cross-sectional dimension sized between 0.01 to 2.0 μm, although such a size range is not exclusive or even necessary to ensure proper operability of the porous polymer separator layer 10. Larger and smaller cross-sectional pore sizes may be present depending on the thickness 300 of the porous polymer separator layer 10, the particular lithium ion battery application in which the porous polymer separator layer 10 is employed, and various other considerations known to skilled artisans.

The porosity of the porous polymer separator layer 10 as a whole is preferably anywhere between about 30% and about 90% and most preferably between about 40% and 70%. The porosity may be distributed such that lithium ions can be communicated through the thickness 300 of the porous polymer separator layer 10 coextensively between the first and second opposed major faces 16, 18 when the separator layer 10 is infiltrated with a liquid electrolyte. The porosity may further be evenly distributed throughout the porous polymer separator layer 10. An evenly distributed porosity would be present if, referring for the moment back to FIG. 2, the cross-section taken across the width 200 of the porous polymer separator layer 10 is divided vertically along the thickness 300 direction into two segments of equal width, one that includes the first edge 12 (segment 1) and one that includes the second edge 14 (segment 2), and the porosity of those segments as measured by any suitable technique, such as mercury porosimetry, deviates from the porosity of the porous polymer separator layer 10 as a whole by no more than 3%. For example, if the entire porous polymer separator layer 10 has a porosity of 60%, and a segment 1 and a segment 2 of the porous polymer separator layer 10 are obtained as just described, and each of those segments has a porosity within the range of 57% to 63%, then the porous polymer separator layer 10 can be said to have an evenly distributed porosity.

One or more types of particles 24 having a melting temperature equal to or higher than the melting temperature of the polymer matrix 20 may be dispersed, if desired, within the polymer matrix 20, as depicted generally in FIG. 3. The presence of such particles 24 may improve mechanical properties and enhance lithium ion conductance through the porous polymer separator layer 10 by helping open the pores 22 that furnish the separator layer 10 with its porosity. Some particular types of particles 24 that may be employed include ceramic particles, cross-linked thermoset polymer particles, and engineering thermoplastic polymer particles, to name but a few examples. Exactly how much of the particles 24 are dispersed within the polymer matrix 20 is subject to a wide variance. In many instances, however, the particles 24 are preferably present in an amount that ranges from about 0 wt. % to about 400 wt. % of the polymer matrix 20; that is, the porous polymer separator layer 10 may comprise, by weight, up to about 80% of the dispersed particles 24 based on the total weight of the polymer matrix 20 and the particles 24. A preferred particle diameter for the particles 24 is about 0.005 µm to about 15 µm and, most preferably, from about 0.05 µm to about 3 µm.

Many specific materials may be employed as the optionally-dispersed particles 24. Some examples of suitable ceramic particles include those of alumina, titania, silica, ceria, zirconia, silicon carbide, boron carbide, titanium nitride, silicon nitride, titanium silicide, tungsten silicide, aluminum boride, titanium boride, mullite, spodumene, zirconium silicate, sillimanite, petalite, and mixtures thereof. Some examples of suitable cross-linked thermoset polymer particles include the cured forms of polyimides, polyurethanes, phenol-formaldehyde resins, melamine-formaldehyde resins, epoxy resins, and mixtures thereof. Some examples of suitable engineering thermoplastic polymer particles include those of a polyimide such as polyetherimide, a polyketone such polyether ketone (PEK), polyether ether ketone (PEEK), and polyarylether ketone (PAEK), a polysulfone such as standard polysulfone, polyarylsulfone, polyethersulfone, and polyphenylsulfone, polyethylene terephthalate, polyphenylene sulfide, ethylene-vinyl acetate, and mixtures thereof. Of course other types of materials not specifically listed above may also be used to fabricate the particles 24 as is generally understood by skilled artisans.

Figure 4:
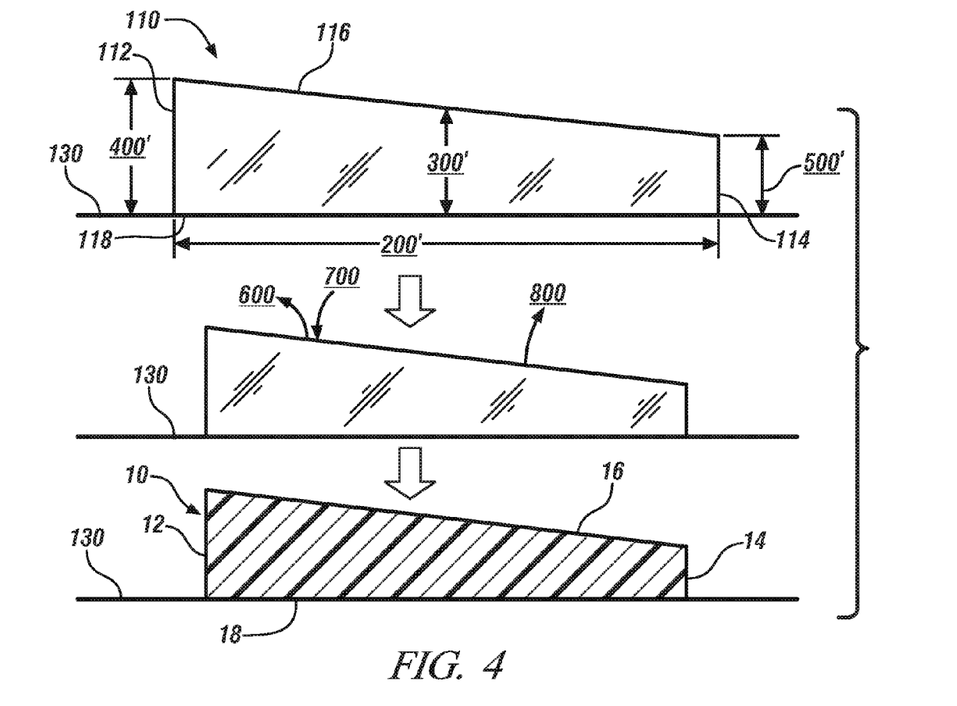
FIG. 4 is a general and diagrammatic depiction of a phase-separation process for making the porous polymer separator layer shown in FIGS. 1-3.

The porous polymer separator layer 10 is made by the phase-separation process shown generally and diagrammatically in FIG. 4. This process includes (1) forming a film 110, which has a cross-section with a non-uniform thickness, from a polymer solution that comprises a polymer material dissolved in a polymer solvent and (2) precipitating the polymer material present in the film 110 into the porous polymer separator layer 10. The phase-separation process may be accomplished according to any of a variety of embodiments. In particular, several different techniques may be employed to precipitate the porous polymer separator layer 10 from the film 110 depending on the polymer material selected to make the separator layer 10, the polymer solvents that are available for dissolving the selected polymer material, and the practicalities that accompany such precipitation techniques, to name but a few factors. The porous polymer separator layer 10 is also preferably dried before being incorporated into an electrochemical battery cell of a lithium ion battery.

The polymer material included in the polymer solution may be any of the previously-mentioned candidates for comprising the polymer matrix 20. Selection of the particular polymer material may depend on several factors including its mechanical strength, temperature resistance, chemical resistance, cost, availability, and ease of manufacturing. The polymer solvent used to dissolve the selected polymer material may be any liquid substance that is able to dissolve the polymer material either at room temperature or at an elevated temperature above room temperature. Other materials may also be included in the polymer solution including, as mentioned earlier, the particles 24 having a melting temperature equal to or higher than the melting temperature of the polymer material that constitutes the polymer matrix 20. Those particles 24, if present, are preferably homogenously suspended within the polymer solution for ultimate dispersal within the polymer matrix 20. The polymer solution may also include a polymer non-solvent that is miscibly mixed with the polymer solvent depending on the technique used to precipitate the polymer material. A polymer non-solvent is a liquid substance that is unable to dissolve the particular polymer material present within the polymer solution.

The polymer solution is prepared with the polymer material, the polymer solvent, and any other materials, in amounts sufficient to make the porous polymer separator layer 10 with its intended thickness and porosity. A typical composition of the polymer solution often includes about 5 wt. % to about 40 wt. %, and more preferably about 10 wt. % to about 25 wt. %, of the polymer material based on the total weight of the polymer material and the polymer solvent. If the particles 24 are suspended within the polymer solution, they are preferably added at an amount that ranges from about 10 wt. % to about 400 wt. % based on the weight of the dissolved polymer material. Moreover, in embodiments where the polymer non-solvent is included, the amount added depends on the identities of the polymer material and the polymer solvent intended to be present in the polymer solution, although it typically ranges from about 0.5 wt. % to about 70 wt. % based on the total weight of the polymer solvent and the polymer non-solvent. All of these possible compositions of the polymer solution provide a relatively wide temperature window in which the selected polymer material can be fully dissolved in the polymer solvent. But in most instances a temperature of the polymer solution that falls between about 20° C. and about 90° C. is sufficient.

The film 110 of the polymer solution may be formed onto a substrate 130 by any suitable procedure notwithstanding the composition of the polymer solution or the precipitation technique employed. The film 110 is formed to have the same basic shape as the resultant porous polymer separator layer 10, only somewhat larger. In other words, the film 110 has a first edge 112, a second edge 114 opposite the first edge 112, and opposed first and second major faces 116, 118 extending between the first and second edges 112, 114. The first and second edges 112, 114 define a width 200' of the film 110 and the first and second major faces 116, 118 define a thickness 300' of the film 110 generally perpendicular to the width 200' direction. Still further, the first edge 112 has a height 400' that is greater than a height 500' of the second edge 114 with both heights 400', 500' being directed upwardly from the substrate 130, so that, like the porous polymer separator layer 10, a cross-section of the film 110 spanning its width 200' exhibits a non-uniform thickness. Each linear dimension (i.e., the width 200', height 400' of the first edge 112, and height 500' of the second edge 114) is typically about 20% to about 2000% greater than the desired corresponding linear dimension of the porous polymer separator layer 10.

The film 110 is preferably formed on the substrate 130 by an extrusion procedure. Such a procedure generally involves pushing the polymer solution through an extruder die and onto the substrate 130 along an extrusion direction (sometimes referred to as the machine direction) with the width 200' of the film 110 being oriented transverse to the extrusion direction. The substrate 130 may be moveable or stationary and may include, for example, a conveyor belt, a support belt, a glass surface, a metal foil, an electrode, or a ceramic sheet. But of course other procedures may also be used to produce the film 110 besides extrusion. The film 110 may be formed by a spraying procedure in which the non-uniform cross-sectional thickness of the film 110 is accommodated by gradually metering different quantities of the polymer solution across the substrate 130. The film 110 may also be formed by a doctor blading procedure in which the non-uniform cross-sectional thickness of the film 110 is accommodated by shifting the angle of the doctor blade to an appropriate extent. Other procedures suitable to form the film 110 such as slot-die coating and comma-bar coating, and procedures not specifically mentioned here but known to skilled artisans, may also be employed.

The dissolved polymer material may be precipitated into the porous polymer separator layer 10 by rendering the polymer material insoluble in the polymer solution. Such precipitation causes the film 110 to shrink progressively as more polymer material precipitates until eventually the porous polymer separator layer 10 is formed, as shown in FIG. 4, and also cultivates the porosity of the porous polymer separator layer 10. In other words, the first edge 12, the second edge 14, the first major face 16, and the second major face 18 of the porous polymer separator layer 10 are derived, respectively, from the first edge 112, the second edge 114, the first major face 116, and the second major face 118 of the film 110. The height relationship originally devised between the first and second edges 112, 114 of the film 110 is also maintained during precipitation of the polymer material such that the height 400 of the first edge 12 of the porous polymer separator layer 10 is greater than the height 500 of the second edge 14 as previously described.

The polymer material present in the film 110 may be precipitated by decreasing the concentration of the polymer solvent (represented by the arrow identified as 600) and increasing the concentration of a polymer non-solvent (represented by the arrow identified as 700), decreasing the temperature of the polymer solution (represented by the arrow identified as 800), or a combination of both. Decreasing the concentration of the polymer solvent and increasing the concentration of a polymer non-solvent may be achieved by extracting the polymer solvent through at least one of solvent-exchange with a polymer non-solvent or evaporation of the polymer solvent from a miscible mixture of the polymer solvent and a polymer non-solvent. Several embodiments that exemplify specific techniques for precipitating the polymer material into the porous polymer separator layer 10 will now be described in more detail.

First Embodiment

The polymer solution may include a real polymer solvent as the polymer solvent. A real polymer solvent is a liquid substance that is able to dissolve the polymer material at room temperature (i.e., 20° C.). The polymer material and the particles 24, if present, may be introduced into the real polymer solvent at room temperature or above and be mixed by mechanical stirring or agitation to form the polymer solution. The polymer solution is then formed into the film 110 with an appropriate non-uniform cross-sectional thickness and, if previously heated, allowed to cool. Allowing the film 110 to sit at room temperature for an extended period of time generally will not, by itself, induce precipitation of the polymer material. A non-exhaustive list of preferred real polymer solvents for some of the polymer materials mentioned above is summarized below in Table 1.

TABLE 1

Real Polymer Solvent(s) for Polymer Materials

| Polymer Material | Real Polymer Solvent(s) |
| --- | --- |
| PEI | NMP |
| PVdF | NMP; DMF; DMAc |
| PES | NMP; DMF; THF |
| PSf, PPSf, PAS | NMP; DMF |
| PAN | NMP; DMF |
| PMMA | NMP; DMF; DMSO; Acetone |
| Aliphatic PA | Aqueous Acetic Acid |
| Aromatic PA | Sulfuric Acid |
| Cellulose | Ethylenediamine with dissolved KSCN |
| Cellulose Derivatives | NMP; DMF |
| PC | NMP; DMF; DMSO |
| PU | NMP; DMF; DMSO |

NMP = N-Methyl-2-Pyrrolidone
DMF = Dimethyl Formamide
DMAc = Dimethylacetamide
THF = Tetrahydrofuran
DMSO = Dimethyl Sulfoxide The film 110 is then optionally exposed to a vapor of a polymer non-solvent to partially precipitate the polymer material. Exposure of the film 110 to the polymer non-solvent vapor can occur in a confined chamber or, alternatively, the polymer non-solvent vapor may be continuously spayed in mist form over the film 110. The polymer non-solvent may be water, a C1-C6 aliphatic alcohol (i.e., methanol, ethanol, n-propanol, iso-propanol, butanol, pentanol, etc.), or a mixture thereof. In a preferred embodiment, the polymer non-solvent used is water and the film 110 is placed in a confined chamber in which an environment having a relative humidity of at least 50%, and typically between about 50% and 95%, and a temperature between about 20° C. and 45° C., is maintained. The film 110 is kept in that environment for a time sufficient to partially precipitate the polymer material. Anywhere from about 5 seconds to about 5 minutes is usually acceptable.

Exposing the film 110 to the polymer non-solvent vapor promotes partial precipitation of the polymer material because some of the polymer non-solvent vapor permeates into the film 110. And the introduction of the polymer non-solvent into the film 110 decreases the concentration of the real polymer solvent and increases the concentration of the polymer non-solvent to such an extent that the polymer material begins to precipitate. The newly-introduced polymer non-solvent then finds itself trapped as small liquid confinements throughout the partially precipitated polymer material. These polymer non-solvent confinements essentially occupy future pore sites and, as such, can help develop smaller and more densely distributed pores in the final porous polymer separator layer 10. The exposure of the film 110 to the polymer non-solvent vapor, however, does not have to be practiced for a number of reasons including a desire to fabricate larger and more elongated pores.

The film 110 is then washed with a polymer non-solvent to fully precipitate (exposure to polymer non-solvent vapor not practiced), or complete precipitation of (exposure to polymer non-solvent vapor practiced), the porous polymer separator layer 10. Such washing may involve immersing the film 110 into a bath that includes the polymer non-solvent or any other suitable procedure. The presence of the polymer non-solvent during washing of the film 110 facilitates solvent-exchange in which the real polymer solvent is extracted from the film 110 and replaced with the polymer non-solvent. The decreasing concentration and eventual replacement of the real polymer solvent that ensues during solvent-exchange causes the polymer material to precipitate into the porous polymer separator layer 10. Replacement of the real polymer solvent with the polymer non-solvent also induces formation of the porosity of the porous polymer separator layer 10 since the dissolved polymer material precipitates into the polymer matrix 20 around many spaced apart and interconnected droplets, beads, globules, and other confinements of the polymer non-solvent that ultimately become the pores 22 when removed. The film 110 may be washed for as long as it takes to derive the porous polymer separator layer 10. The polymer non-solvent used here can be the same as before and, likewise, is again preferably water.

Second Embodiment

The polymer solution may include a latent polymer solvent as the polymer solvent. A latent polymer solvent is a liquid substance that is able to dissolve the polymer material at a temperature above room temperature (i.e., above 20° C.) but not at room temperature itself. The polymer material and the particles 24, if present, may be introduced into the latent polymer solvent and be mixed by mechanical stirring or agitation to form the polymer solution at an elevated temperature above room temperature that accommodates solvation of the polymer material. Exactly what temperature is sufficient depends on the polymer material and the latent polymer solvent selected. But in general the latent polymer solvent usually needs to achieve a temperature in the range of about 30° C. to about 80° C. to dissolve the polymer material. The polymer solution is then formed into the film 110 with an appropriate non-uniform cross-sectional thickness. Unlike the last embodiment though, the polymer material may be precipitated by reducing the temperature of the film in addition to optionally exposing the film 110 to a vapor of a polymer non-solvent and washing the film 110 with a polymer non-solvent. A non-exhaustive list of preferred latent polymer solvents for some of the polymer materials mentioned above is summarized below in Table 2.

TABLE 2

Latent Polymer Solvent(s) for Polymer Materials

| Polymer Material | Latent Polymer Solvent(s) |
|---|---|
| PEI | DMF; THF |
| PVdF | MIK; DMP; Acetone |
| PSf, PPSf, PAS | THF |
| PAN | Propylene Carbonate |
| PMMA | Tert-Butyl Alcohol |

DMF = Dimethyl Formamide
THF = Tetrahydrofuran
MIK = Methyl Isobutyl Ketone
DMP = Dimethyl Phthalate The polymer material present in the film 110 is then precipitated into the porous polymer separator layer 10 as just described; that is, the film 110 while still at an elevated temperature conducive to polymer material solvation may be optionally exposed to a vapor of a polymer non-solvent and washed with a polymer non-solvent. These precipitation procedures need not be described in further detail here since they have already been adequately described above. Alternatively, the film 110 may be allowed to cool before and/or during exposure to the polymer non-solvent vapor, if practiced, and washing with the polymer non-solvent to help precipitate of the polymer material. Decreasing the temperature of the film 110 in this way causes precipitation of the polymer material because the ability of the latent polymer solvent to dissolve the polymer material gradually diminishes, and eventually ceases, as the temperature of the film is brought to room temperature. The polymer non-solvent used here may be water, which is preferred, as well as C1-C6 aliphatic alcohol, or a mixture of water and the C1-C6 aliphatic alcohol.

Third Embodiment

The polymer solution may include a miscible mixture of a real polymer solvent and polymer non-solvent. The real polymer solvent and the polymer non-solvent may be present in the miscible mixture at about 30 wt. % to about 99.5 wt. % and about 0.5 wt. % to about 70 wt. %, respectively, based on the total weight of the miscible mixture exclusive of the polymer material. The polymer material and the particles 24, if present, may be introduced into the miscible mixture of the real polymer solvent and the polymer non-solvent and be mixed by mechanical stirring or agitation to form the polymer solution at an elevated temperature above room temperature that accommodates solvation of the polymer material. Exactly what temperature is sufficient depends on the polymer material, the polymer solvent, and the polymer non-solvent selected. But in general the miscible mixture usually needs to achieve a temperature in the range of about 30° C. to about 80° C. to dissolve the polymer material. The polymer solution is then formed into the film 110 with an appropriate non-uniform cross-sectional thickness. A non-exhaustive list of preferred real polymer solvents and polymer non-solvents for some of the polymer materials mentioned above is summarized below in Table 3.

TABLE 3

Real Polymer Solvent(s) and Polymer Non-Solvent(s) for Polymer Materials

| Polymer Material | Real Polymer Solvent(s) | Polymer Non-Solvent(s) |
|---|---|---|
| PEI | NMP | Water; Ac; Al |
| PVdF | NMP; DMF; THF | Water; Al |
| PES | NMP; DMF; THF | Water; Ac; Al |
| PSf, PPSf, PAS | NMP; DMF | Water; Ac; Al |
| PAN | NMP; DMF | Water; Ac; Al |
| PMMA | NMP; DMF; DMSO; Acetone | Water; Al |
| Aliphatic PA | Aqueous Acetic Acid | Water; Al |
| Aromatic PA | Sulfuric Acid | Water |
| Cellulose | Ethylenediamine with dissolved KSCN | Water; Al |
| Cellulose Derivatives | NMP; DMF | Water |
| PC | NMP; DMF; DMSO | Water; Al |
| PU | NMP; DMF; DMSO | Water |

NMP = N-Methyl-2-Pyrrolidone
DMF = Dimethyl Formamide
THF = Tetrahydrofuran
DMSO = Dimethyl Sulfoxide
Ac = Acetone
Al = C1-C6 aliphatic alcohol The film 110 is then cooled from the elevated temperature and washed with a polymer non-solvent to precipitate the polymer material into the porous polymer separator layer 10. Cooling the film 110 is preferably performed first followed by washing with the polymer non-solvent. During cooling of the film 110, which may be cooled in an ambient environment or with the help of fans, the miscible mixture gradually loses its ability to dissolve the polymer material due to the presence of the polymer non-solvent. This causes the polymer material to precipitate out of the miscible mixture around many spaced apart and interconnected droplets, beads, globules, and other confinements of the polymer non-solvent that are essentially occupying future pore sites. The subsequent washing of the film 110 completes precipitation of the polymer material into the porous polymer separator layer 10 through solvent-exchange in which, as before, the polymer solvent is extracted from the film 110 and replaced with the polymer non-solvent. A further discussion related to washing the film 110 with the polymer non-solvent need not be recited here since it has already been adequately described above. The preferred polymer non-solvent used in this embodiment for washing the film 110 is water.

Fourth Embodiment

The polymer solution may include a miscible mixture of a polymer solvent (real or latent) and polymer non-solvent in which the polymer solvent has a lower boiling point than the polymer non-solvent. The polymer solvent and the polymer non-solvent may be present in the miscible mixture at about 60 wt. % to about 99.5 wt. % and about 0.5 wt. % to about 40 wt. %, respectively, based on the total weight of the miscible mixture. The polymer material and the particles 24, if present, may be introduced into the miscible mixture of the polymer solvent and the polymer non-solvent and be mixed by mechanical stirring or agitation to form the polymer solution at a temperature that accommodates solvation of the polymer material yet is below the boiling point of the polymer solvent. The polymer solution is then formed into the film 110 with an appropriate non-uniform cross-sectional thickness. A non-exhaustive list of preferred polymer solvents and polymer non-solvents for some of the polymer materials mentioned above is summarized below in Table 4.

TABLE 4

| Polymer Solvent(s) and Polymer Non-Solvent(s) for Polymer Materials | | |
|---|---|---|
| Polymer Material | Polymer Solvent(s) | Polymer Non-Solvent(s) |
| PVdF | Acetone (latent) | Water |
| PMMA | Acetone (real) | Water |

The film 110 is then heated to evaporate the polymer solvent at a faster rate than the polymer non-solvent. For example, if the polymer solution includes the polymer material dissolved in a miscible mixture of acetone and water, then the film 110 should be heated to evaporate acetone, which has a boiling point at standard pressure of around 56° C., faster than the water, which has a boiling point at standard pressure of around 100° C. The more rapid evaporation of the polymer solvent causes the concentration of the polymer solvent in the film 110 to decrease and, consequently, the concentration of the polymer non-solvent to increase. This in turn promotes precipitation of the polymer material around many spaced apart and interconnected droplets, beads, globules, and other confinements of the polymer non-solvent that are essentially occupying future pore sites. The subsequent washing of the film 110 completes precipitation of the polymer material into the porous polymer separator layer 10 through solvent-exchange in which, as before, any remaining polymer solvent is extracted from the film 110 and replaced with the polymer non-solvent. A further discussion related to washing the film 110 with the polymer non-solvent need not be recited here since it has already been adequately described above. Any type of heating procedure may be used to evaporate the polymer solvent from the film 110 including heat lamps and/or an oven.

The porous polymer separator layer 10 may be dried following precipitation of the polymer material by any of the first through fourth embodiments just described or some other suitable precipitation technique. Drying may be practiced to remove any polymer non-solvent and residual polymer solvent that may be contained in the pores 22 or absorbed into the polymer matrix 20 of the porous polymer separator layer 10. Very little if any shrinkage of the porous polymer separator layer 10 occurs during such drying compared to the shrinkage involved in precipitating the porous polymer separator layer 10 from the film 110. Any suitable drying technique may be used to effectuate drying including, for example, subjecting the porous polymer separator layer 10 to a stream of hot air or some other non-reactive gas, placing the separator layer 10 in an oven, or passing the separator layer 10 under a series of heat lamps, to name but a few possible drying techniques. A preferred drying technique, however, involves placing the porous polymer separator layer 10 in an oven that provides a heated environment in the range of about 110° C. to about 150° C. for about 10 minutes to about 10 hours.

Referring now back to FIGS. 1-3, the porous polymer separator layer 10 may be used in a way that helps maintain a more evenly distributed current density in an electrochemical battery cell of a lithium ion battery. To be used for such a purpose, for example, the porous polymer separator layer 10 may be oriented within the cell such that the first edge 12 is located between confronting surfaces of the negative and positive electrodes in a region of the cell where the electrodes are prone to experience increased relative electrochemical activity. Oftentimes this region coincides with a side of the electrochemical battery cell proximate a connection feature of a metallic current collector associated with the negative electrode and/or a connection feature of a metallic current collector associated with the positive electrode. Orienting the first edge 12 of the porous polymer separator layer 10 in this way compensates for the tendency to experience increased localized electrochemical activity in that particular region of the cell by making the lithium ions travel a greater distance through the first edge 12 of the separator layer 10 relative to the second edge 14. In other words, because of their height differences, the first edge 12 of the porous polymer separator layer 10 provides a greater overall resistance to lithium ion transport between the electrodes than the second edge 14 and, as such, orienting those edges 12, 14 at regions of the cell having expectations of greater and lesser relative electrochemical activities, respectively, helps equalize the electrochemical activity between the electrodes throughout the cell.

The ability of the porous polymer separator layer 10 to help maintain a more evenly distributed current density can enhance the longevity and reliability of the electrochemical battery cell in some instances. One potential benefit of a more evenly distributed current density is the better utilization of the electrodes; that is, the portions of the electrodes closer to the connection features of the metallic current collectors will be less likely to decay at an accelerated rate while the portions more removed from the connection features will be less likely to be operationally underused. Another potential benefit of a more evenly distributed current density is a more even temperature distribution within the cell. The avoidance of localized high temperature spots due to increased relative electrochemical activity can help maintain the integrity of the separator which, in addition to the porous polymer separator layer 10, may include one or more polymer components that are susceptible to degradation at an elevated temperature. Yet another potential benefit of a more evenly distributed current density is better dimensional stability of the cell. For instance, the electrochemical battery cell may expand during the charging phase and contract during the discharge phase. A more evenly distributed current density can help achieve more uniform expansion and contraction of the electrodes and, as a result, reduce the occurrence of mechanical strains and corresponding stresses that can lead to loss of contact between the electrodes and the interadjacent separator.

Figure 5:
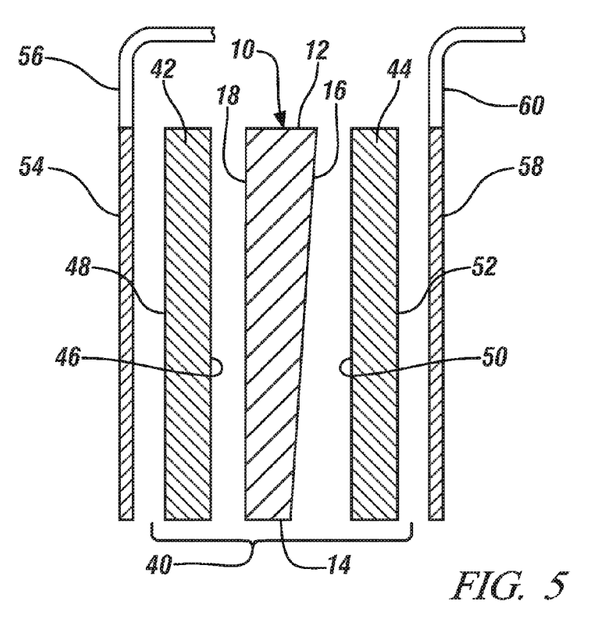
FIG. 5 is a generalized cross-sectional view of an electrochemical battery cell for a lithium ion battery that includes a negative electrode, a positive electrode, and the porous polymer separator layer depicted in FIGS. 1-3 disposed between the negative and positive electrodes.

The porous polymer separator layer 10 may be assembled into an electrochemical battery cell 40 of a lithium ion battery as depicted, for example, in the exploded cross-sectional view of FIG. 5. The electrochemical battery cell 40 includes a negative electrode 42, a positive electrode 44, and the porous polymer separator layer 10 disposed between the two electrodes 42, 44. The negative electrode 42 includes an inner face surface 46 and an outer face surface 48 relative to the location of the porous polymer separator layer 10. The positive electrode 44 similarly includes an inner face surface 50 and an outer face surface 52. And when assembled into the electrochemical battery cell 40, the inner face surfaces 46, 50 of the negative and positive electrodes 42, 44 confront one another and are pressed against the second major face 18 and the first major face 16 of the porous polymer separator layer 10, respectively, as shown. Of course other arrangements of the porous polymer separator layer 10 are possible. For instance, the porous polymer separator layer 10 could be arranged so that the inner face surface 46 of the negative electrode 42 is pressed against the first major face 16 of the separator layer 10 and the inner face surface 50 of the positive electrode 44 is pressed against the second major face 18. The porous polymer separator layer 10 may also be combined with other materials or layers to form a multi-component composite separator in which one or both of the first and second major faces 16, 18 is no longer pressed against their respective electrode inner face surfaces 46, 50.

Situated on each side of the electrochemical battery cell 40 is a metallic current collector that includes a connector tab for accommodating an electrical connection. More specifically, a negative-side metallic current collector 54 that includes a projecting negative polarity tab 56 is associated with the negative electrode 42 and a positive-side metallic current collector 58 that includes a projecting positive polarity tab 60 is associated with the positive electrode 44. The negative-side metallic current collector 54 supports the outer face surface 48 of the negative electrode 42 and the positive-side metallic current collector 50 supports the outer face surface 52 of the positive electrode 44. The metallic current collectors 54, 58 also preferably engage their respective electrode outer face surfaces 48, 52 over an appreciable interfacial surface area, as shown, to facilitate the efficient collection and distribution of free electrons. Each of the metallic current collectors 54, 58 may be constructed from any of a wide variety of electrically conductive metal. In a preferred embodiment, however, the negative-side metallic current collector 54 is a thin-film copper foil and the positive-side metallic current collector 58 is a thin-film aluminum foil.

Figure 6:
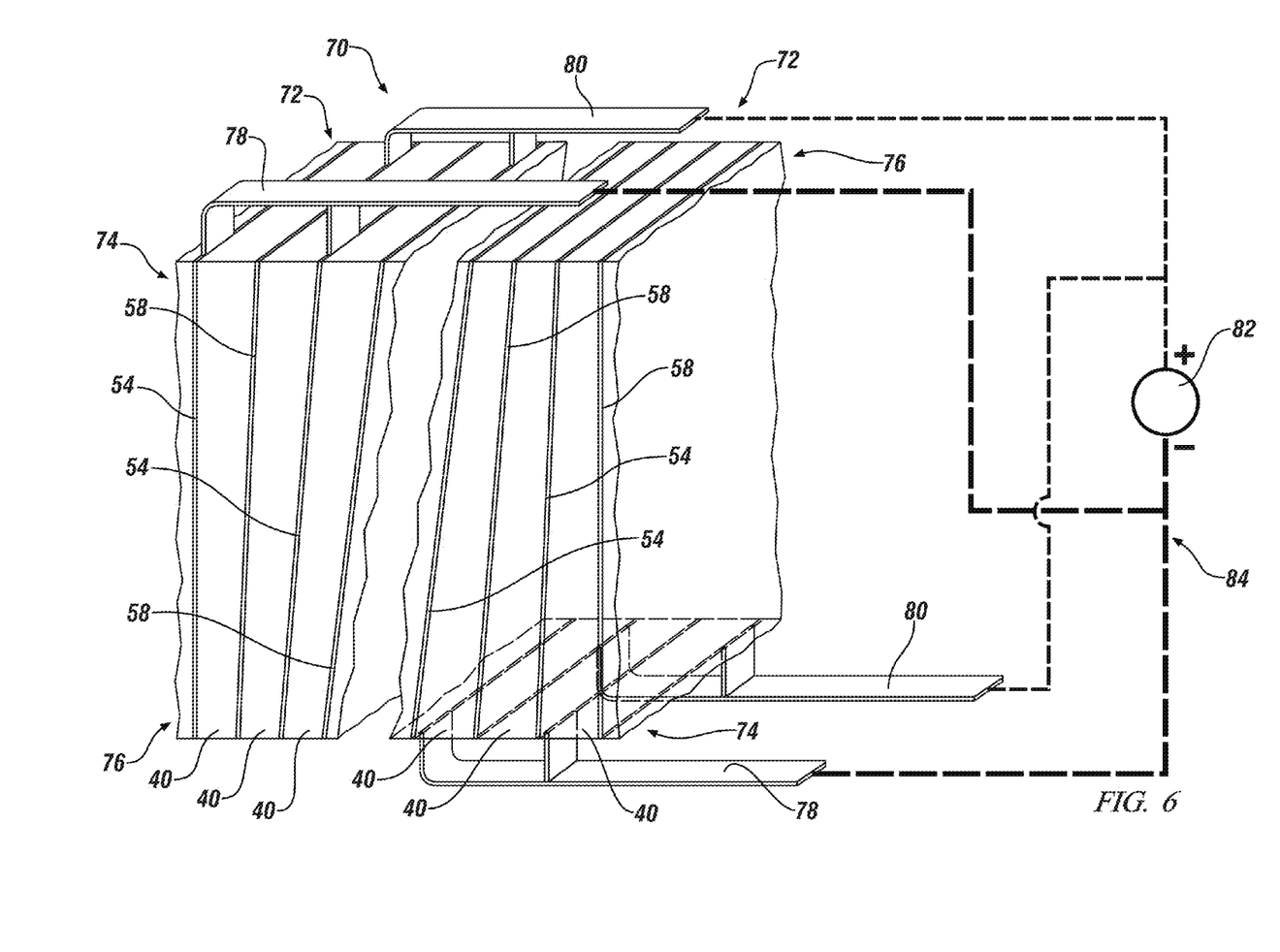
FIG. 6 is a generalized and schematic illustration of a lithium ion battery that includes several of the electrochemical battery cells depicted in FIG. 5.

A typical thickness of the electrochemical battery cell 40 extending between the metallic current collectors 54, 58 is about 70 µm to about 350 µm. Each electrode 42, 44 is preferably about 30 µm to 150 µm thick and, as already mentioned, the porous polymer separator layer 10 is about 10 µm to 50 µm thick at each of the first and second edges 12, 14 with the first edge 12 being at least 2% thicker than the second edge 14. The metallic current collectors 54, 58 are usually about 5 µm to 20 µm thick. The relatively thin and flexible nature of the electrochemical battery cell 40 and its associated metallic current collectors 54, 58 allows them to be rolled, folded, bent, or otherwise maneuvered into a variety of configurations depending on design specifications and spatial constraints. The electrochemical battery cell 40 can be configured, as shown in FIGS. 5 and 6, for modular side-by-side stacking with other similarly constructed electrochemical battery cells or, in another embodiment, it may be rolled into a wound cylindrical configuration with other cells.

The negative electrode 42 is preferably constructed from a lithium host material such as, for example, graphite, silicon, or lithium titanate. The lithium host material may be intermingled with a polymeric binder material to provide the negative electrode with structural integrity and, optionally, a conductive fine particle diluent. The lithium host material is preferably graphite and the polymeric binder material is preferably one or more of polyvinyldiene fluoride (PVdF), an ethylene propylene diene monomer (EPDM) rubber, styrene butadiene rubber (SBR), a carboxymethoxy cellulose (CMC), polyacrylic acid, or mixtures thereof. Graphite is normally used to make the negative electrode because, on top of being relatively inert, its layered structure exhibits favorable lithium intercalation and deintercalation characteristics which help provide the electrochemical battery cell with a suitable energy density. Commercial forms of graphite that may be used to construct the negative electrode are available from Timcal Graphite and Carbon (headquartered in Bodio, Switzerland), Lonza Group (headquartered in Basel, Switzerland), and Superior Graphite (headquartered in Chicago, Ill.). The conductive particle diluent may be very fine particles of, for example, high-surface area carbon black.

The positive electrode 44 is preferably constructed from a lithium-based active material that stores intercalated lithium at a higher electrochemical potential than the lithium host material used to make the negative electrode. The same polymeric binder materials (PVdF, EPDM, SBR, CMC, polyacrylic acid) and conductive fine particle diluent (high-surface area carbon black) that may be used to construct the negative electrode may also be intermingled with the lithium-based active material for the same purposes. The lithium-based active material is preferably a layered lithium transition metal oxide, such as lithium cobalt oxide ($LiCoO_2$), a spinel lithium transition metal oxide, such as spinel lithium manganese oxide ($LiMn_2O_4$), a lithium polyanion, such as a nickel-manganese-cobalt oxide [$Li(Ni_xMn_yCO_z)O_2$], lithium iron phosphate ($LiFePO_4$), or lithium fluorophosphate ($Li_2FePO_4F$). Some other suitable lithium-based active material that may be employed include lithium nickel oxide ($LiNiO_2$), lithium aluminum manganese oxide ($Li_xAl_yMn_{1-y}O_2$), and lithium vanadium oxide ($LiV_2O_5$), to name but a few alternatives. Mixtures that include one or more of these recited lithium-based active materials may also be used to make the positive electrode.

The porous polymer separator layer 10 functions as an electrically insulative mechanical barrier that physically separates the confronting inner face surfaces 46, 50 of the electrodes 42, 44 to prevent a short-circuit in the electrochemical battery cell 40. The porous polymer separator layer 10 is further infiltrated with a liquid electrolyte throughout its porosity that is able to communicate lithium ions. The liquid electrolyte, which also wets both electrodes 42, 44, is preferably a lithium salt dissolved in a non-aqueous solvent. Some suitable lithium salts that may be used to make the liquid electrolyte include $LiClO_4$, $LiAlCl_4$, LiI, LiBr, LiSCN, $LiBF_4$, $LiB(C_6H_5)_4$, $LiAsF_6$, $LiCF_3SO_3$, $LiN(CF_3SO_2)_2$, $LiPF_6$, and a mixture that includes one or more of these salts. The non-aqueous solvent in which the lithium salt is dissolved may be a cyclic carbonate (i.e., ethylene carbonate, propylene carbonate), an acyclic carbonate (i.e., dimethyl carbonate, diethyl carbonate, ethylmethylcarbonate), an aliphatic carboxylic ester (i.e., methyl formate, methyl acetate, methyl propionate), a γ-lactone (i.e., γ-butyrolactone, γ-valerolactone), an acyclic ether (i.e., 1,2-dimethoxyethane, 1,2-diethoxyethane, ethoxymethoxyethane), a cyclic ether (i.e., tetrahydrofuran, 2-methyltetrahydrofuran), or a mixture that includes one or more of these solvents.

The porous polymer separator layer 10 is also oriented between the electrodes 42, 44 to help maintain a more uniform current density within the electrochemical battery cell 40. The orientation of the porous polymer separator layer 10 shown here locates the first edge 12 between the confronting inner face surfaces 46, 50 of the electrodes 42, 44 in a region of the cell 40 adjacent the projecting polarity tabs 56, 60 of the metallic current collectors 54, 58 and, furthermore, locates the second edge 14 between the confronting inner face surfaces 46, 50 of the electrodes 42, 44 in a region of the cell 40 more removed from the projecting polarity tabs 56, 60 than the first edge 12. Such positioning of the first and second edges 12, 14 of the porous polymer separator layer 10 compensates for the increased localized electrochemical activity that may occur in the cell 40 near the projecting polarity tabs 56, 60. This is because the lithium ions migrating between the electrodes 42, 44 have to travel a greater distance through the porous polymer separator layer 10 at the first edge 12 relative to the second edge 14. And making the lithium ions travel further through the porous polymer separator layer 10 in a region of the electrochemical battery cell 40 more prone to higher relative electrochemical activity helps make lithium ions more evenly available to the entire inner face surfaces 46, 50 of the electrodes 42, 44.

The electrochemical battery cell 40 may be connected to a plurality of other similarly constructed electrochemical battery cells 40 to produce a lithium ion battery 70 as shown in FIG. 6. Anywhere from five to fifty of the electrochemical battery cells 40 are typically connected in series (although a parallel connection is also permitted) to form a battery cell pack 72 that includes a thick end 74 and a thin end 76 in the stacking direction of the cells 10. The thick end 74 of the cell pack 72 is the end that includes alignment of the first edges 12 of the porous polymer separators 10 and, conversely, the thin end 76 of the cell pack 72 is the end that includes alignment of the second edges 14. Several of the battery cell packs 72 may be further connected in series or in parallel to provide the lithium ion battery 70 with the voltage and current capacity demanded for a particular vehicle application. A total of 20 to 150 electrochemical battery cells 40 are typically included in the lithium ion battery 70 if the battery 70 is intended to be used as an on-board a power source for a HEV or an EREV. To maintain an overall rectangular shape of the lithium ion battery 70, moreover, a pair of adjacent battery cell packs 72 may be aligned with the thick end 74 of the cell pack 72 diametrically opposed to the thin end 76 of the other cell pack 72.

A negative terminal 78 and the positive terminal 80 of the lithium ion battery 70 may be connected to an electrical device 82 as part of an external circuit 84 established between the negative electrodes 42 and the positive electrodes 44 of the several electrochemical battery cells 40. The electrical device 82 may be a wide variety of electrical loads and power-generating devices. An electrical load is a power-consuming device that is powered fully or partially by the lithium ion battery 70. Conversely, a power-generating device is one that charges or re-powers the lithium ion battery 70 through an applied external voltage. The electrical load and the power-generating device can be the same device in some instances. For example, the electrical device 82 may be an electric motor for a HEV or an EREV that is designed to draw an electric current from the lithium ion battery 70 during acceleration and provide a regenerative electric current to the lithium ion battery 70 during deceleration. The electrical load and the power-generating device can also be different devices. For example, the electrical load may be an electric motor for a HEV or an EREV and the power-generating device may be an AC wall outlet, an internal combustion engine, and/or a vehicle alternator.

The lithium ion battery 70 can provide a useful electrical current to the electrical device 82 by way of reversible electrochemical reactions that occur in the electrochemical battery cells 40 when the external circuit 84 is closed to connect the negative terminal 78 and the positive terminal 80 at a time when the negative electrodes 42 contain intercalated lithium (i.e., battery discharge). The electrochemical potential difference between the negative electrode 42 and the positive electrode 44 in each cell 40—approximately 2.5 to 4.3V—drives the oxidation of intercalated lithium contained in the negative electrodes 42. Free electrons produced by this oxidation reaction are collected by the negative-side current collectors 54 and are supplied to the negative terminal 78. A flow of free electrons is harnessed and directed through the electrical device 82 from the negative terminal 78 to the positive terminal 80 and eventually to the positive electrodes 44 by way of the positive-side current collectors 58. Lithium ions, which are also produced at the negative electrodes 42, are concurrently carried through the porous polymer separator layers 10 by the liquid electrolyte in route to the positive electrodes 44 as well. The flow of free electrons through the electrical device 82 from the negative terminal 78 to the positive terminal 80 can be continuously or intermittently provided until the negative electrodes 42 are depleted of intercalated lithium or the capacity of the electrochemical battery cells 40 is otherwise spent.

The lithium ion battery 70 can be charged or re-powered at any time by applying an external voltage to the electrochemical battery cells 40 to reverse the electrochemical reactions that occur during discharge. The applied external voltage compels the otherwise non-spontaneous oxidation of intercalated lithium contained in the positive electrodes 44 to produce free electrons and lithium ions. The free electrons are collected by the positive-side current collectors 58 and are supplied to the positive terminal 80. A flow of the free electrons is directed to the negative terminal 78 and eventually to the negative electrodes 42 by way of the negative-side current collectors 54. The lithium ions are concurrently carried back through the porous polymer separator layers 10 by the liquid electrolyte towards the negative electrodes 42 as well. The lithium ions and the free electrons eventually reunite and replenish the negative electrodes 42 with intercalated lithium to prepare the electrochemical battery cells 40 for another discharge phase. The external voltage may originate from the electrical device 82 as previously mentioned or by some other suitable mechanism.

While the lithium ion battery 70 shown in FIG. 6 includes several battery cell packs 72 arranged with diametrically opposed thick and thin ends 74, 76—with each of the cell packs 72 including several modularly-stacked electrochemical battery cells 40—it should be understood the illustrated lithium ion battery 70 is a schematic representation of only one possible configuration. FIG. 6 is not intended to inform the relative sizes of the electrochemical battery cells' components or to limit the wide variety of structural configurations the lithium ion battery 70 may assume. Various structural modifications to the lithium ion battery 70 shown in FIG. 6 are possible, despite what is explicitly illustrated, as is well understood by skilled artisans. For example, the battery cell packs 72 could just as easily be arranged with their thick ends 74 adjacent to one another and their thin ends 76 adjacent to one another such that the lithium ion battery assumes a donut-shaped configuration instead of the rectangular configuration shown in FIG. 6.

The above description of preferred exemplary embodiments is merely descriptive in nature and not intended to limit the scope of the claims that follow. Each of the terms used in the appended claims should be given its ordinary and customary meaning unless specifically and unambiguously stated otherwise in the specification.

The invention claimed is:

1. A method of making and using a porous polymer separator layer that may function as all or part of a separator for use in an electrochemical battery cell of a secondary liquid-electrolyte battery, the method comprising:
   (a) forming a film from a polymer solution that comprises a polymer material dissolved in a polymer solvent, the film having a cross-section with a non-uniform thickness; and
   (b) precipitating the polymer material present in the film into a porous polymer separator layer, the porous polymer separator layer having a cross-section that comprises a first edge and a second edge opposite the first edge, each of the first and second edges of the cross-section having a height that defines a thickness of the porous polymer separator layer at the first and second edges, respectively, and wherein the height of the first edge is greater than the height of the second edge such that the porous polymer separator layer has a thickness at the cross-section that decreases from the first edge to the second edge, the porous polymer separator layer further having a porosity in the range of about 30% to about 90% that is distributed evenly throughout the separator layer.

2. The method of claim 1, wherein the height of the first edge of the porous polymer separator layer is at least 2% greater than the height of the second edge of the porous polymer separator layer.

3. The method of claim 1, wherein the heights of each of the first and second edges of the porous polymer separator layer range from about 10 μm to about 50 μm.

4. The method of claim 1, wherein the polymer material included in the polymer solution comprises at least one of a polyimide, a polyamide, a polysulfone, a polyacrylate, a polycarbonate, a polyurethane, polyvinylidene fluoride, or an acrylic.

5. The method of claim 1, wherein the polymer material comprises at least one of polyetherimide, polyvinylidene fluoride, polyacrylonitrile, standard polysulfone, or polyethersulfone.

6. The method of claim 1, wherein the polymer solution in step (a) comprises about 5% to about 40% of the polymer material based on the total weight of the polymer material and the polymer solvent.

7. The method of claim 1, wherein the polymer solution in step (a) further comprises particles having a higher melting temperature than the polymer material.

8. The method of claim 1 further comprising:
   (c) drying the porous polymer separator layer;
   (d) disposing the porous polymer separator layer between a negative electrode and a positive electrode to assemble an electrochemical battery cell of a secondary liquid-electrolyte battery; and
   (e) infiltrating the porous polymer separator layer with a liquid electrolyte.

9. The method of claim 1, wherein step (a) comprises:
   extruding the film along an extrusion direction such that a width of the film oriented transverse to the extrusion direction includes the cross-section with a non-uniform thickness.

10. The method of claim 1, wherein the polymer solution in step (a) comprises a real polymer solvent that dissolves the polymer material at room temperature, and wherein step (b) comprises washing the film with a polymer non-solvent to effectuate solvent exchange of the real polymer solvent with the polymer non-solvent.

11. The method of claim 10, wherein step (b) further comprises:
    exposing the film to a vapor of a polymer non-solvent before washing the film with a polymer non-solvent.

12. The method of claim 1, wherein the polymer solution in step (a) comprises a latent polymer solvent that dissolves the polymer material at an elevated temperature above room temperature, and wherein the film is formed at or above the elevated temperature, and wherein step (b) comprises washing the film with a polymer non-solvent to effectuate solvent exchange of the latent polymer solvent with the polymer non-solvent.

13. The method of claim 12, wherein step (b) further comprises at least one of:
    cooling the film to below the elevated temperature at which the latent polymer solvent dissolves the polymer material; or
    exposing the film to a vapor of a polymer non-solvent before washing the film with a polymer non-solvent.

14. The method of claim 1, wherein the polymer solution in step (a) comprises a miscible mixture of a real polymer solvent and a polymer non-solvent at an elevated temperature above room temperature that facilitates solvation of the polymer material in the miscible mixture of the real polymer solvent and the polymer non-solvent, and wherein step (b) comprises (b1) cooling the film to below the elevated temperature at which the miscible mixture dissolves the polymer material and (b2) washing the film with a polymer non-solvent to effectuate solvent exchange of the real polymer solvent with the polymer non-solvent.

15. The method of claim 1, wherein the polymer solution in step (a) comprises a miscible mixture of the polymer solvent and a polymer non-solvent, the polymer non-solvent having a higher boiling point than the polymer solvent, and wherein step (b) comprises evaporating the polymer solvent from the film at a faster rate than the polymer non-solvent.

16. An electrochemical battery cell of a lithium ion battery that includes a negative electrode, a positive electrode, and a porous polymer separator layer disposed between the negative electrode and the positive electrode, the porous polymer separator layer functioning to electrically insulate the negative and positive electrodes yet communicate lithium ions between the electrodes when infiltrated with a liquid electrolyte, and wherein the porous polymer separator layer is formed according to the method of claim 1.

17. A method of making and using a porous polymer separator layer that may function as all or part of a separator for use in an electrochemical battery cell of a lithium ion battery, the method comprising:

(a) forming a film onto a substrate from a polymer solution that comprises a polymer material dissolved in a polymer solvent, the film having a cross section including a first edge and second edge opposite the first edge, each of the first and second edges having a height directed upwardly from the substrate that defines a thickness of the film at the first and second edges, respectively, and wherein the height of the first edge is greater than the height of the second edge such that the film has a thickness at the cross-section that decreases from the first edge to the second edge;

(b) precipitating the polymer material present in the film into a porous polymer separator layer using a technique that comprises washing the film with a polymer non-solvent, and wherein the porous polymer separator layer has a cross-section that comprises a first edge derived from the first edge of the film, a second edge derived from the second edge of the film, the first and second edges of the porous polymer separator layer having a similar height relationship as the first and second edges of the film, and opposed first and second faces that extend between the first and second edges of the porous polymer separator layer, the porous polymer separator layer further having a porosity distributed throughout the separator layer such that, when the separator layer is infiltrated with a liquid electrolyte, lithium ions can be communicated through the thickness of the separator layer coextensively between the first and second opposed faces; and (c) drying the porous polymer separator layer to remove any of the polymer solvent and the polymer non-solvent from the porous polymer separator layer.

18. The method of claim 17, wherein the height of the first edge of the porous polymer separator layer is at least 2% greater than the height of the second edge.

19. The method of claim 17, wherein the porosity of the porous polymer separator is distributed evenly throughout the separator layer and ranges from about 30% to about 90%.

20. The method of claim 17, further comprising:

(d) disposing the porous polymer separator layer between a negative electrode and a positive electrode to assemble an electrochemical battery cell of a lithium ion battery; and (e) infiltrating the porous polymer separator layer with a liquid electrolyte.

\* \* \* \* \*